United States Patent

Strobel

[15] 3,700,016

[45] Oct. 24, 1972

[54] DOUBLE SLOTTED SAW

[72] Inventor: Keene S. Strobel, Everett, Wash.

[73] Assignee: Weyerhaeuser Company, Tacoma, Wash.

[22] Filed: July 26, 1971

[21] Appl. No.: 166,164

[52] U.S. Cl. ............143/140 R, 143/137, 143/133 B
[51] Int. Cl. ............................................B27b 33/08
[58] Field of Search....143/133 R, 137, 140 R, 133 B

[56] References Cited

UNITED STATES PATENTS 70,728 11/1867 Lockwood.................143/137
3,563,286 2/1971 Strobel......................143/140

*Primary Examiner*—Donald R. Schran
*Attorney*—Patrick D. Coogan et al.

[57] ABSTRACT

A circular saw blade has a plurality of spaced teeth around the periphery of a saw plate and a plurality of radial slots positioned both from the periphery inward and from the eye outward; the slots preferably being faced on the cutting side with a facing element extending substantially the length of the respective slot with the facing element having a width substantially the same or slightly less than the width of the kerf of the cutting teeth.

5 Claims, 4 Drawing Figures

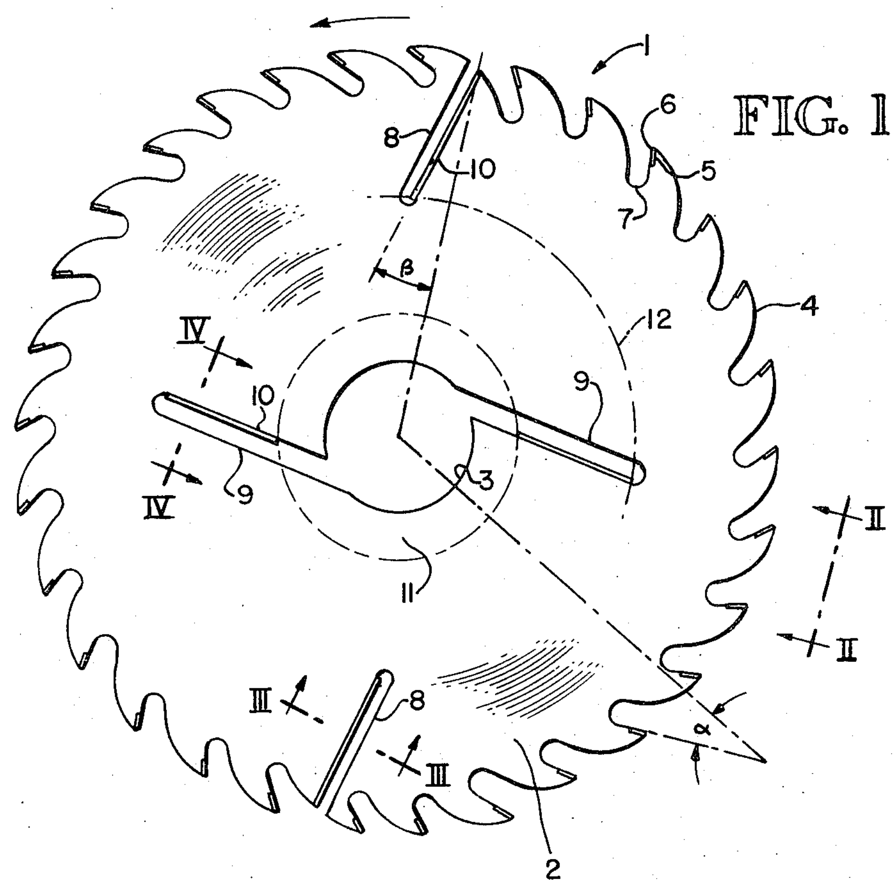
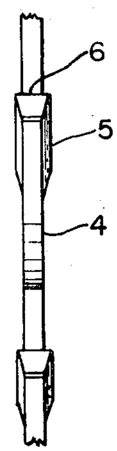
FIG. 2
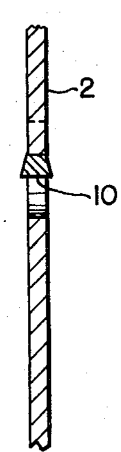
FIG. 3
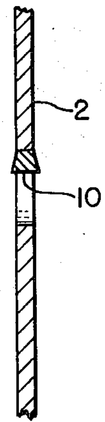
FIG. 4
INVENTOR.
KEENE S. STROBEL
BY Bryan C. Ogdand
Patrick D. Coogan
ATTORNEYS

DOUBLE SLOTTED SAW

BACKGROUND OF THE INVENTION

This invention relates generally to an improved circular saw blade for longitudinally sawing wood. More particularly it relates to an improved large diameter circular saw blade having a plurality of generally radially extending slots cut therein.

The prior art in the circular saw field is crowded and has been well developed over the years. Recently a U.S. Pat. No. issued to K. S. Strobel et al. — 3,563,286 that represented an advance in the art. This patent which is incorporated herein by reference, has been assigned to the assignee of the present invention and discloses a circular saw blade which is effectively divided into independently operating sectors through the proper placement of radial slots. Cutting elements are mounted on the trailing edges of the slots and project laterally beyond the side faces of the circular saw and operate to restore an off-line cut developed in the preceding sector and to clear sawdust from the cut. This slotted circular saw which is known in the industry under the trademark — Strob-Saw, has opposing radially extending slots which run nearly to the periphery of the collar which holds the saw in position thereby resulting in the independent sector operation.

As this circular saw gained wide acceptance in the industry several manufacturers and users attempted to build such saws with a diameter of approximately 18 inches and above. With the slotted circular saw of such large diameter it was found that sometimes during its cutting operation it began to vibrate and consequently cause off-line cuts with subsequent damage to the saw. The problem then presented itself to provide the same enhanced characteristics for a circular slotted saw with a diameter on the order of 18 inches and above.

The present invention, while solving the vibration problem for larger diameters, is also applicable to diameters of less than 18 inches. Two ways of accomplishing the desired result, that is eliminating the flutter or vibration, are either to increase the saw blade thickness or shorten the radially extending slots thereby increasing the rigidity of the overall circular saw blade. By increasing the saw blade thickness it is readily apparent that the kerf which is produced also increases and this is an undesirable feature in sawing wood. By shortening the slot length the full width planing action and sawdust removal features are eliminated thereby yielding a less desirable circular saw blade.

With most circular saws of the prior art it was necessary to stretch and relieve the blade prior to final installation. This procedure, known as "tensioning" by those skilled in the art, was followed in order to provide a saw blade that could compensate for operational elongation due to centrifugal force, heat, or shock loading. This procedure was costly and could be performed only by those with many years experience in the field. Thus it is desirable to provide a means to prevent or compensate for blade distortion which can be easily applied to the saw blade.

Thus the intent in designing the circular saw blade of the present invention was to maintain most of the characteristics of the aforementioned slotted circular saw blade while at the same time inherently increasing rigidity to prevent vibration or flutter while maintaining a thin saw blade to yield a narrow kerf.

Accordingly, from the foregoing, one object of the present invention is to substantially reduce or eliminate flutter in large diameter thin circular saws.

Another object is to eliminate the vibrational problem while maintaining the advantages and results which are provided by the aforementioned slotted saw blade.

Yet another object is to provide means in the saw blade to compensate for distortion.

These and other objects of the invention will become apparent upon reading the following specification in conjunction with the attached drawing.

SUMMARY OF THE INVENTION

Briefly, this invention is practiced in one form by positioning a plurality of radially extending slots about the face of a circular saw blade which has a plurality of circumferentially spaced teeth about its periphery. A plurality of said slots are formed extending from the outer periphery toward the eye and a plurality of similar slots are formed to extend radially outward from the eye toward the outer periphery. The slots are preferably faced on the cutting or trailing edge with an inlaid material having a width substantially that of the width of the kerf of the saw teeth.

BRIEF DESCRIPTION OF THE DRAWING

FIG. 1 is a face elevation of the saw blade embodying the present invention.

FIG. 2 is an enlarged partial cross section of the saw blade showing the peripheral saw teeth and cutting elements as taken along line II—II OF FIG. 1.

FIG. 3 is a similar enlarged partial cross section of the outer slot of the saw blade as taken along line III—III of FIG. 1.

FIG. 4 is also a similar enlarged partial cross section of the inner slot of the saw blade as taken along line IV—IV of FIG. 1.

DESCRIPTION OF THE PREFERRED EMBODIMENT

Referring first to FIG. 1 the circular saw blade is generally indicated as 1 and includes a disk-like saw blade or plate 2 having a central opening or eye 3 therein and a plurality of saw teeth 4 circumferentially positioned around the periphery of the plate 2. Each tooth 4 has a leading edge relative to the direction of rotation of the blade, with each of the edges faced with a suitable insert 5 having a cutting edge 6. The inserts 5 may be of any suitable hard metal such as tungsten carbide, cobalt steel alloy, or alloys sold under the trademarks Stellite or Studite. The inserts 5 are fixed to the saw tooth 4 by welding or brazing or other suitable means of attachment. These inserts 5 have a width greater than that of the plate 2 and each of the saw teeth 4 are provided with a rounded gullet area 7. It is of course the width of the inserts 5 at their respective cutting edges 6 that determines the kerf which is taken from the sawn wood. The face angle $\alpha$ of the cutting edge 6 which taken with respect to a radial line extending from the center of the plate 2 to the cutting edge 6 may be that of any of the conventionally used saw blades, and preferably ranges from between 10°–45° of positive hook angle.

Between the regular spacing of two of the peripheral teeth 4 the saw plate 2 is slotted from the periphery inwardly. The outer slots 8 are cut directly opposite each other so as to balance the saw plate 2 as is fully described in the aforementioned issued U.S. patent to K. S. Strobel et al. Opposed to the outer slots 8 at a position which is approximately 90° circumferentially displaced from the slots 8 are the inner slots 9 which extend outwardly from the central opening or eye 3. The inner slots 9 and outer slots 8 are adapted to perform a cutting or planing function through the proper placement on their cutting or trailing sides of hard facing elements 10 of tungsten carbide, cobalt steel alloy, Stellite, Studite or other suitable facing material. Each facing element 10 is welded or brazed to each appropriate slot in the saw plate 2. It has been found that an acceptable saw can be produced without positioning a facing element on the inner slots 9.

The cutting edge or facing element 10 of each slot is preferably at a negative angle $\beta$ with respect to saw motion and to a radial line extending from the center of the saw plate to the periphery thereof. The inner slots 9 are also cut directly opposite each other so as to completely balance the saw plate 2. The angle $\beta$ may range from −1° to −40°, but preferably ranges from −10° to −20°. The width of the facing elements 10 is substantially the same or slightly less than the extreme width of the saw teeth 4. The facing elements 10 extend substantially the entire operating length of the inner 9 and outer slots 8 when both utilize facing elements.

A circumferential area designated as 11 at the central opening or eye 3 is the area where a suitable collar can exert sufficient pressure to substantially fix the saw plate 2 on the appropriate arbor. It should be appreciated that while the depth of the inner slots 9 extend all the way to the eye 3 and consequently through the collar area 11, the facing elements 10 for the inner slots 9 will end at a radial position where the maximum circumference of the appropriate collar intersects the slot 9. Thus the facing elements 10 for the inner slots 9, during operation, extend substantially up to and are adjacent to the collar attachment.

In the recently issued patent to Strobel et al the depth of the outer slots extend nearly to the periphery of the collar element which holds the saw in position. In terms of structure these lengthy slots divided the saw plate into two independently operating sectors. As previously mentioned this resulted in a dynamically unstable saw when large diameter thin plates were utilized. By shortening the outer slots 8 a distance which is directly proportional to the increase in saw plate rigidity and with the addition of the opposed inner slots 9, nearly the same benefits plus additional ones for large diameter saws, as was obtainable with the saw of U.S. Pat. No. 3,563,286, are now realized. Thus the main thrust of the instant invention is concerned with shortening the depth of the outer slots 8 to a position, depending on the saw plate diameter, which reduces the vibrational problem at a particular saw plate speed. Correspondingly, the inner slots 9 are added to the saw plate 2 in order to maintain the full width planing action for the saw plate 2 as well as to provide the self tensioning characteristic at the eye 3.

In the ideal saw plate construction, as the outer slots 8 are shortened and the inner slots 9 added the ends of each of the respective slots will substantially meet a common circumferential line 12 which can be positioned outwardly from the central opening 3 a distance which is from between one-fifth and four-fifths of the radial distance from the central opening 3 to the outer periphery.

An added advantage of the inner slots 9 is the thermal stress and heat dispersion accommodation characteristic which is present with the inner slots that open to the central opening 3. It should be appreciated that with the addition of the inner slots 9 any heat buildup toward the central opening 3 will be dispersed at the slots 9 and additionally the slots 9 will allow thermal expansion to freely occur in the saw plate 2 thereby resisting any buckling tendency. Similarly with the facing elements 10 covering the full width of the saw plate 2 any sticks, slivers or sawdust that accumulate around the collar line will normally be removed by the action of the centrifugal force of the turning saw. By so removing the accumulated material the frictional heat which tends to build up can be substantially eliminated. Eliminating distortion of course eliminates poorly cut lumber, bends, and saw breakage.

The action of the facing elements 10 is fully described in the aforementioned patent to Strobel et al but by way of brief explanation here, it is apparent that since the facing elements 10 are substantially equal to the extreme kerf or width of the saw teeth 4 which pick up substantially all of the sawdust that has drifted by the gullet areas 7 of each of the saw teeth, they will effectively hold this material in a position ahead of each facing element. When the slots are in a negative hook position the collected sawdust and other material is immediately ejected by centrifugal force from the cutting area as soon as each of the slots leave the cut. Each faced slot removes all the sawdust it has collected in each quarter revolution of the saw allowing the other sector of the saw plate 2 to enter the cut free of any surplus debris or sawdust. It should be appreciated that in this instance there are four saw plate sectors which extend circumferentially between adjacent slots. This debris removal action reduces any heat that might be generated and also reduces crowding of the saw because of lingering sawdust.

An additional advantage of the saw plate 2 of the instant invention is in its simple maintenance. The facing elements 10 are very simple to sharpen because the hard inserts can be easily sharpened with a suitable standard grinding wheel and with standard equipment. In addition, welding or brazing of the facing inlays on the slots is easy because the slots extend completely out to the periphery of the saw plate thus any heat that is generated by welding does not distort the blade. Saws having slots of the configuration as depicted in FIG. 1 can be made to cut almost any thickness of wood desired, depending entirely on the diameter of the saw or saws. Although their most useful application is in single or double arbor edgers wherein multiple members of these saws are held in fixed position the saws of this invention are applicable in any gang or ripping application where saws tend to bind during cutting operations. The thickness of the saw plate affects the thickness of the kerf of the saw. Because the saws of this invention can be operated successfully with almost little or no breakage, the kerf can be reduced a significant amount from that necessary with conventional saw blades.

While a detailed example of the principle embodiment has been described, it is understood that many changes and modifications may be made in the above described circular saw blade without departing from the spirit of the invention. All such modifications are intended to be included within the scope of the appended claims.

What is claimed is:

1. A saw comprising:

a generally circular saw plate having a plurality of teeth spaced about the periphery thereof, a central opening in the saw plate for a mounting means passing through the saw, a first set of at least two slots in the saw plate extending outwardly from the central opening toward the outer periphery and spaced circumferentially so as to balance the saw plate, a second set of at least two slots in the saw plate extending inwardly from the periphery toward the central opening and spaced circumferentially from said first set so as to balance the saw plate, and respective cutting elements mounted on the leading edges of the teeth and the trailing edges of the first set and the second set of slots, each projecting laterally in both directions beyond the side faces of the saw plate.

2. The saw as in claim 1 wherein said first and second sets of slots, extending outwardly and inwardly respectively, traverse a portion of the saw plate whereby the slot ends substantially meet an imaginary circumferential line on the saw plate which is positioned outwardly from the central opening a distance which is from between one-fifth and four-fifths of the radial distance from the central opening to the outer periphery.

3. The saw as in claim 1 wherein the teeth are regularly spaced around the periphery of the saw plate and separated by gullets and the second set of slots are positioned between the regularly spaced teeth.

4. The saw as in claim 1 wherein the first and second sets of slots are positioned at a negative angle with respect to saw motion and to a radial line extending from the center of the saw plate to the periphery thereof.

5. The saw as in claim 1 wherein the lateral width of the cutting elements on the trailing edges of the slots is slightly less in width than the lateral width of the cutting elements mounted on the teeth.

* * * * *